United States Patent [19]

Eicher et al.

[11] Patent Number: 4,783,143

[45] Date of Patent: Nov. 8, 1988

[54] METHOD FOR SUITABLY POSITIONING LIGHT WAVEGUIDES FOR COUPLING LOCATIONS AND FOR COUPLING ELEMENTS IN A LIGHT WAVEGUIDE SWITCH

[75] Inventors: Joachim Eicher; Lothar Kiesewetter, both of Berlin, Fed. Rep. of Germany

[73] Assignee: Siemens Aktiengesellschaft, Berlin and Munich, Fed. Rep. of Germany

[21] Appl. No.: 23,247

[22] Filed: Mar. 9, 1987

[30] Foreign Application Priority Data

Mar. 7, 1986 [DE] Fed. Rep. of Germany ....... 3607566

[51] Int. Cl.⁴ ................................................ G02B 6/36
[52] U.S. Cl. .................................. 350/320; 350/96.2; 350/96.21
[58] Field of Search ...................... 350/96.2, 96.21, 320

[56] References Cited

U.S. PATENT DOCUMENTS

| 4,325,607 | 4/1982 | Carlsen | 350/96.21 |
| 4,452,507 | 6/1984 | Winzer | 350/96.2 |
| 4,529,265 | 7/1985 | Toya et al. | 350/96.21 |

FOREIGN PATENT DOCUMENTS

| 2616071 | 10/1977 | Fed. Rep. of Germany. |
| 3138686 | 4/1983 | Fed. Rep. of Germany. |
| 3335673 | 4/1987 | Fed. Rep. of Germany. |
| 59-102207 | 6/1984 | Japan ................................. 350/96.2 |

OTHER PUBLICATIONS

Comerford et al.; "Snap-in Fiber-Optic Aligners"; *IBM Technical Disclosure Bulletin;* vol. 21, No. 10, Mar. 1979; p. 4282.

Ulrich et al.; "Beam-to-Fiber Coupling with Low Standing Wave Ratio"; *Applied Optics,* Jul. 15, 1980, vol. 19, No. 14, pp. 2453–2456.

8099 "IEEE Transactions on Microwave Theory and Techniques", vol. MTT-30 (1982) Oct., No. 10, New York, U.S.A.

Patents Abstracts of Japan, vol. 5, No. 32 (P-50) [704], Feb. 27, 1981, No. 55156903.

*Primary Examiner*—John D. Lee
*Assistant Examiner*—John Ngo
*Attorney, Agent, or Firm*—Hill, Van Santen, Steadman & Simpson

[57] ABSTRACT

In a method and apparatus for suitably positioning light waveguides for coupling ends of function fibers at coupling locations, the coupling ends of the function fibers are aligned and fixed on a carrier element. Guide capillaries are formed to fit the jackets of the function fibers precisely and are aligned on both sides of a coupling location. The alignment is achieved with the assistance of a wrap-free auxiliary fiber after which the auxiliary fiber is removed and the function fibers are subsequently introduced into the guide capillaries and fixed therein.

20 Claims, 4 Drawing Sheets a)

b)

c)

d)

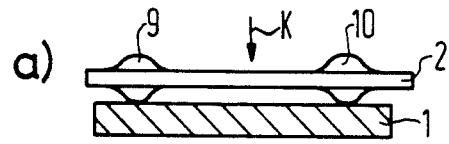
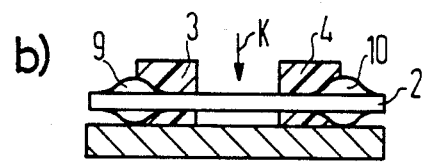
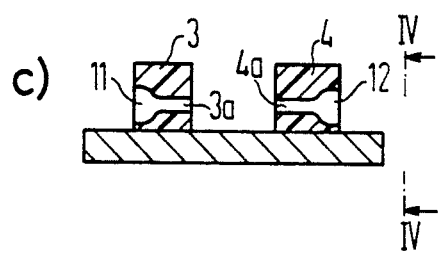
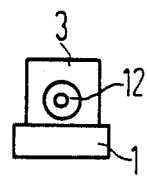
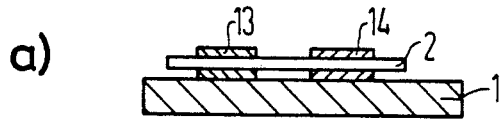
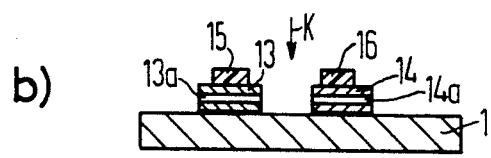

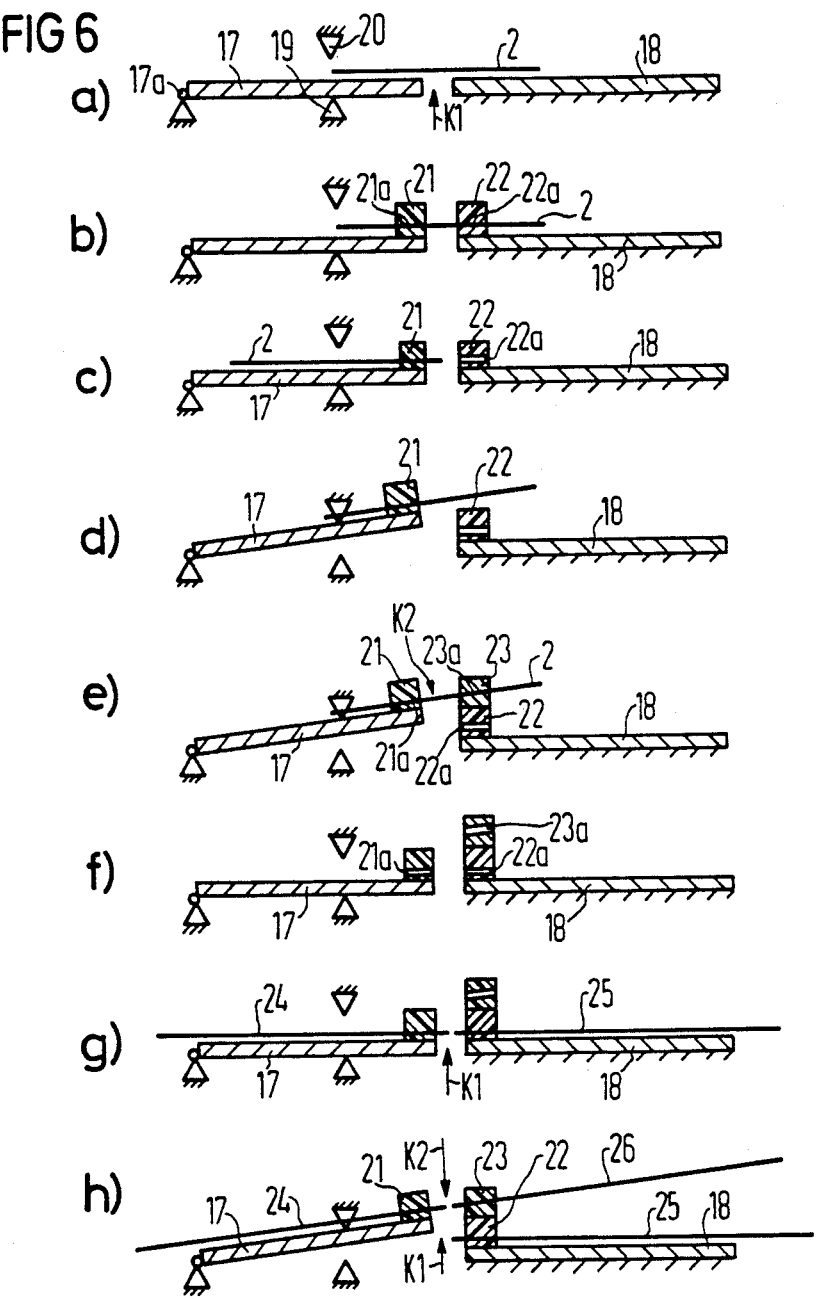

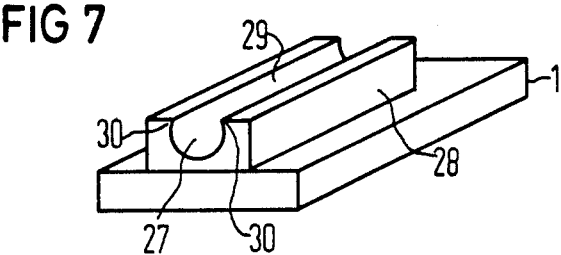
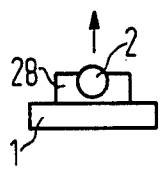
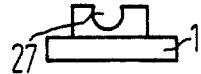
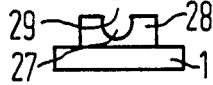
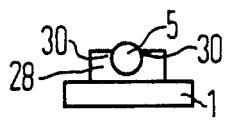
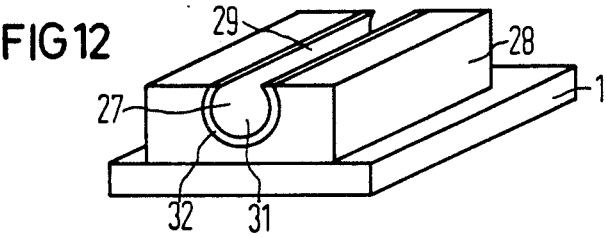

METHOD FOR SUITABLY POSITIONING LIGHT WAVEGUIDES FOR COUPLING LOCATIONS AND FOR COUPLING ELEMENTS IN A LIGHT WAVEGUIDE SWITCH

BACKGROUND OF THE INVENTION

The invention relates generally to a method for suitably positioning light waveguides for joining the light waveguides in a fiber-to-fiber coupling location. The coupling ends of the fibers, hereinafter referred to as function fibers, to be coupled are respectively aligned and fixed on a carrier element. The invention is also directed to a coupling element for a light waveguide switch.

When joining light waveguides in coupling locations such as found, for example, in light waveguide switches, an exact alignment of the optical axis and a slight spacing between the end faces of the light waveguides are critical. Otherwise, transmission losses occur at the coupling location due to mechanical maladjustment. Losses can be distinguished with regard to two factors: (1) a radial offset of the optical axes due to an axial spacing of the fiber end faces, and (2) an angular error between the optical axes.

For aligning the light waveguides at coupling locations, especially in releasable plug type connections, known methods require extremely involved and exact fitting component parts which have bores that align more or less well with one another. Glass fibers are aligned and fixed in these bores. In the manufacture of non-releasable or switchable coupling locations, there is an attempt to achieve an alignment of fibers with high precision devices having exact guides and fine adjustments. German published application No. 31 38 686, discloses such a device. In such switches, the fibers usually have their coupling ends placed on the respective stationary and movable carrier elements and they are aligned as precisely as possible relative to one another, afterwhich they are glued in place. This procedure is disclosed, for example, in German published application No. 33 35 673. These known methods exhibit fundamental difficulties when utilized for mechanical switchable coupling locations wherein one fiber is to be selected to be coupled to one or more additional fibers. This difficulty results because when the fibers are to be mounted in an apparatus, they can be aligned in only one switch position. This method precludes any involved adjustment of the already fixed fibers for other switch positions.

Therefore, it is an objective of the present invention to develop a joining method which can be utilized without precise apparatus or involved adjustment in the mounting of light waveguides in fiber-to-fiber coupling locations for use in devices as discussed above. The method of the present invention avoids angular errors and axial offset and keeps the distance between the fiber end faces at a minimum. This enables a compensation of core eccentricities and results in acceptable component tolerances. The invention may also be utilized for a coupling element of a light waveguide switch which also has these advantages.

SUMMARY OF THE INVENTION

The objectives are achieved in accord with the invention in that a respective guide element which has a guide capillary exactly fitted to the jacket of a function fiber is arranged at each side of a coupling location on a respective carrier element. The guide elements are placed in alignment with the assistance of a wrap-free auxiliary fiber which penetrates both guide capillaries and which has the same diameter as the function fibers. The guide elements are fixed on their respective carrier elements. After removal of the auxiliary fiber, the coupling ends of the function fibers are joined in the respective guide capillaries and affixed therein.

With the method of the present invention, it should be noted that it is not the function fibers themselves which are initially arranged on the carrier element and glued in place, but on the contrary the guide elements comprising the guide capillaries are applied to the carrier element and aligned. Since the auxiliary fiber is not broken in the coupling location but extends across the coupling location through both guide elements, these guide elements can be aligned in a straightforward manner and with extreme precision. After these guide elements are then aligned and fixed on the respective carrier elements, the auxiliary fiber can be removed. The function fibers subsequently are inserted into the guide capillaries which are then aligned relative to one another with optimal precision by the guide elements.

An especially simple embodiment of the joining method envisions that the guide elements are not formed until application onto the carrier element and that, namely, the auxiliary fiber is put in place and is clad at both sides of the coupling location with a plastic material which is hardenable. The resulting rigidifying material is the desired guide region. This material must therefore be of such nature that it has only slight bonding force relative to the auxiliary fiber but has great binding force relative to the substrate or, respectively, the carrier element. If necessary, the auxiliary fiber can also be provided with a thin film of parting agent before being clad in order to facilitate the removal of the auxiliary fiber after the guide elements are shaped. The auxiliary fiber itself can be an optical fiber, however, it need not comprise any light conducting properties. Thus, other fibers or wires of stiff and tensile material, for example, steel wire, SiC whisker wire or boron fiber also may be utilized.

In another embodiment, the guide elements can utilize prefabricated guide sleeves already provided with the guide capillaries, these guide sleeves being threaded onto the auxiliary fiber for alignment, and arranged at both sides of the coupling location. The guide elements are then fixed onto the respective carrier element. Shape-stable materials, such as steel or glass, in addition to plastics, can therefore be employed.

Regardless of whether the guide elements are prefabricated or are shaped immmediately upon application to the carrier elements, the guide capillaries and the guide elements can be respectively provided with a funnel-shaped expansion at those ends facing away from the coupling location in order to faciliate the insertion of the function fibers. In order to achieve this, it is provided in a preferred embodiment of the method, that the auxiliary fiber is respectively given a drop-shaped or cone-shaped cladding of a parting material so that when the guide element is formed, the drop-shaped cladding is located at the region of the guide element facing away from the coupling location. The guide elements are thus formed by both the parting material clad onto the auxiliary fiber, as well as, the auxiliary fiber itself. After hardening of the guide element, the auxiliary fiber along with the drop-shaped cladding is removed to produce the guide capillaries with the funnel-shaped expansion.

The invention is preferably utilized in the manufacturing of coupling elements for switches, whereby at least one movable end of a light waveguide may be selectively brought into alignment with one of two or more stationary coupling ends of light waveguides, or vice versa. Suitable positioning of the joining of one fiber end relative to two fiber ends residing opposite and that are arranged offset, wherein a stationary and a movable carrier element are each first provided with a guide element. An auxiliary fiber is utilized to align a guide element on the movable carrier element with one of the guide elements on the stationary carrier element. The auxiliary fiber is then withdrawn from at least one of the guide elements. The movable carrier element is then brought into another position for the formation of a second coupling location and the auxiliary fiber is moved over the second coupling location. Then, finally, a further guide element is aligned and fixed with the auxiliary fiber. The method can also be used for aligning and fixing further guide elements in situations where more than two coupling locations are to be provided between a stationary and a movable carrier element.

A particularly advantageous development of the invention may be appreciated wherein capillaries provided with a continuous slot parallel to their longitudinal axis can be employed and that at least the function fibers can be laterally inserted into the capillaries through the slot. The use of the slots in the capillaries eliminates a potential problem when the function fibers must have their free ends inserted into the tube formed by the capillaries. When the function fibers are pushed through the tube, material may be stripped from the inside wall of the capillaries. This material can then reside on the end face of the fiber. The end face of the fiber remains undeteriorated when the use of lateral slots are placed in the capillaries. The function fiber therefore remains in a suitable condition for optimal light transmission.

Furthermore, the edges of the slot may be fashioned from an elastically spreadable material and the slot may have a width that is less than the diameter of the fibers. The inside wall of the capillary may also be formed by a fiber coating stripped from the auxiliary fiber.

Despite a wrapping of the fibers of more than 180°, the insertion of the fibers in the capillaries and the removal of a fiber, for example, the auxiliary fiber, from the capillaries is therefore enabled.

The object of the invention is further achieved with a coupling element or a light waveguide switch which has at least one stationary carrier element and one movable carrier element adjustable into at least two positions. At least one coupling end of a light conducting function fiber is fixed to every carrier element, and two ends of function fibers align with one another in at least one position of the movable carrier element. This coupling element is characterized in that the carrier elements have guide elements fixed on them with preshaped guide capillaries adapted to the diameter of the respective function fibers. The coupling ends of the function fibers are inserted into these guide capillaries and then fixed.

BRIEF DESCRIPTION OF THE DRAWINGS

The features of the present invention which are believe to be novel, are set forth with particularity in the appended claims. The invention, together with further objects and advantages, may best be understood by reference to the following description, taken in conjunction with the accompanying drawings, the several figures of which like reference numerals identify like elements, and in which:

FIGS. 3a through 3c schematically depict the method of forming funnel-shaped expansions with regard to the guide capillaries and the guide elements;

FIG. 4 is an elevational view of FIG. 3c;

FIGS. 5a and 5b depict the alignment and fixing of prefabricated guide elements;

FIGS. 6a through 6h schematically depict the method of joining of light waveguides in a coupling element of a switch having two switch positions; and FIGS. 7 through 12 illustrate capillaries and guide elements which are opened at a side parallel to an axis thereof.

DESCRIPTION OF THE PREFERRED EMBODIMENT

The novel method of the present invention has general applicability, but is most advantageously utilized for the alignment of light waveguides on stationary carriers as well as on light waveguide switches. Referring now to FIGS. 1a through 1d, , for the manufacturing of a coupling location, a mechanically stiff carrier element 1, for example, a plate or a tube, is utilized of which no high demands regarding manufacturing tolerances need to be observed and no special surface quality is necessary. In accord with FIG. 1a, a short auxiliary fiber 2 is placed adjacent this carrier element 1, the diameter of the auxiliary fiber 2 corresponds to the diameter of the function fibers to be joined later. The coupling location K is provided on the carrier element 1 at the location indicated with an arrow.

Figure 1:
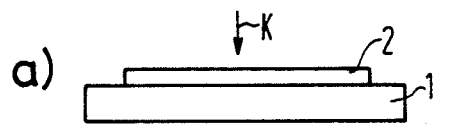
FIGS. 1a through 1d schematically depict the novel method of joining two coupling ends of light waveguides on a common carrier element.
Figure 1:
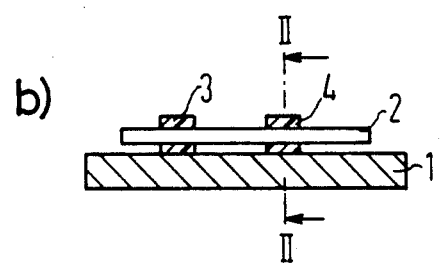
Figure 2:
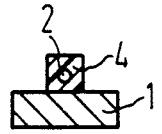
FIG. 2 is a cross-sectional view of FIG. 1b.
Figure 2:
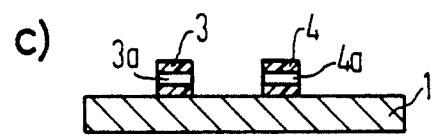
Figure 2:
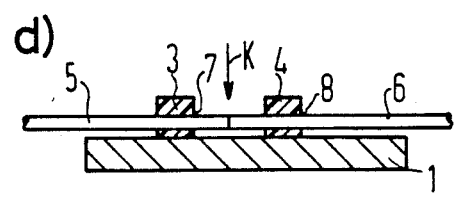

Using the carrier element 1, two guide elements 3 and 4 being in close proximity and at both sides of the coupling location K are now applied in accordance with FIG. 1b, in that the auxiliary fiber 2 is clad with a plastic, hardenable or solidifying material, such as plastic, solder or the like. The material used for cladding should exhibit only low adhesion relative to the auxiliary fiber 2 but should exhibit great adhesion relative to the carrier element 1. The auxiliary fiber 2 may also have a thin film of parting agent before the cladding for better unmolding when the auxiliary fiber is withdrawn from the material after the cladding has solidified, thus forming guide elements 3 and 4. Two guide capillaries 3a and 4a are thus aligned with one another and fit exactly to the outside diameter of the auxiliary fiber 2, as well as, to the outside diameter of the function fibers. After the auxiliary fiber 2 is removed, the guide elements 3 and 4 (see FIG. 1c), remain on the carrier element 1.

The function fibers 5 and 6 to be coupled are then introduced into these guide capillaries 3a and 4a from either side of the coupling location K (see FIG. 1d). Thus, any mechanical, axial offset and angular error are minimized. Even in a non-releasable connection, the inventive alignment of the fiber ends to be coupled via the two guide elements at both sides of the coupling location offers advantages over coupling in a single guide capillary. Namely, the joining location is thereby freely accessible for a cleaning process of the end faces of the fibers and is prepared for a glued splice or thermal splice.

Rotary and translational degrees of freedom remain for the functional fibers when they are placed in the guide capillaries 3a and 4a and can be used for sensitive final adjustment of the fibers 5 and 6. First, a remaining, optical axial offset produced, for example, due to core eccentricites of the fibers can be minimized with the rotational degree of freedom by appropriate turning of the fibers around their axes. Second, the spacing at the end faces from one another can be set with a translational degree of freedom, for abutment in the present situation.

When the final adjustment has been made, the function fibers 5 and 6 are fixed, preferably by filling the capillary gaps 7 and 8 between fibers and guide elements with a suitable adhesive.

The threading of the function fibers into the exactly fitted guide capillaries 3a and 4a can be facilitated with funnels which are tapered towards the guide capillaries. These funnels are formed in the region where the function fibers are introduced into the capillaries. This is shown with reference to FIGS. 3a through 3c. The funnels 11 and 12 can be formed by a drilling operation, however, it is especially advantageous to form the funnels 11 and 12 during the manufacturing of the guide capillaries 3a and 4a. To form the funnel-shaped expansions 11 and 12, drops 9 and 10 of an easily removable parking agent, for example, wax, are applied to the auxiliary fiber 2 in a region of the opening of the guide capillaries. When manufacturing the guide capillaries 3a and 4a by second casting of the auxiliary fiber 2 in the cladding with the guide elements 3 and 4, the respective drop 9 or 10 is partially co-cast, as shown in FIG. 3b. At the removal of the auxiliary fiber 2 and the drops 9 and 10, the desired funnel-shaped expansions 11 and 12 remain in the guide capillaries 3a and 4a (see FIGS. 3c and 4).

In accordance with FIG. 5, an alternative embodiment for the alignment of guide capillaries 13a and 14a utilizes the employment of half-finished goods in the form of guide sleeves 13 and 14 which exactly fit the auxiliary fiber 2. The guide capillaries 13a and 14a already are formed in guide sleeves 13 and 14 by drilling or other appropriate second casting of an auxiliary fiber. Materials other than plastic, for example, steel or glass, can also be employed for these guide sleeves. These preshaped guide sleeves 13 and 14 are aligned on the carrier element 1 with the assistance of the auxiliary fiber 2 which passes through them (see FIG. 5a). Subsequently, the guide sleeves 13 and 14 are fixed to the reference plane of the carrier element 1 (see FIG. 5b), whereby an adhesive cladding 15 and 16 are utilized.

The present method for suitably positioning light waveguides has initially been set forth with reference to the example of a non-releasable connection of the light waveguides. However, the novel method may be also utilized for other applications concerned with couplings between fibers which can be switched.

This method of the invention yields special advantages in the manufacture of mechanically switchable coupling locations, as shown in FIGS. 6a through 6h. For example, the coupling elements schematically shown are part of a switch as disclosed in the initially cited German published application No. 31 38 686. This coupling element comprises a movable carrier element 17 which is pivotably seated at one end 17a, and also comprises a stationary carrier element 18. The movable carrier element 17 which is fashioned, for example, as a switch tongue in a relay, is switchable between two rigid detents 19 and 20. A light conducting fiber 24 can be selectively coupled to one of the fibers 25 or 26 (see FIG. 6h). The two fibers 25 and 26 are fixed on the stationary carrier element 18.

As shown in FIG. 6a, initially the surface of the stationary carrier element 18 and that of the movable carrier element 17 lie in a common plane. Two guide elements 21 and 22 are built up at both sides of the coupling location K1, and two aligning guide capillaries 21a and 22a are generated in these guide elements 21 and 22 with the assistance of an auxiliary fiber 2, which is placed across the coupling location K1. The procedure for forming the guide elements 21 and 22 corresponds to that previously described for the production of a non-releasable connection.

With the two guide capillaries 21a and 22a of FIGS. 6a through 6c have been produced, then, as shown in FIG. 6c, the auxiliary fiber 2 is withdrawn from the guide capillary 22a and the movable switch element 17 is switched into the second switch position at the detent 20. The auxiliary fiber 2 positioned in the guide capillary 21a is now moved across the coupling location K2 and is used as a guide for a further guide capillary 23a of a guide element 23. The auxiliary fiber 2 is thereby clad warp free with hardenable material, according to FIG. 6e, and as also set forth above. The auxiliary fiber 2 used for producing and aligning the guide capillaries is removed after hardening of the guide elements, so that either the guide capillaries 21a and 22a or 21a and 23a at both sides of the switching location K1 or K2, respectively, now reside opposite one another in alignment with their respective switch positions (see FIG. 6f). This type of copying of guide capillaries can be continued in accordance with the desired function and number of coupling locations.

After the introduction of the function fibers 24, 25 and 26, they are successively set with respect to end face spacing and core eccentricity for each of the switch positions shown in FIG. 6g and 6h. The fibers are subsequently fixed in the guide capillaries.

The method of the invention thus guarantees an aligning arrangement of the function fibers in a plurality of switch levels, these being potentially limited by fixed detents. A simple adjustment is thereby guaranteed, this being limited to the adjustment of the axial end face spacing and, under given circumstances, to minimization of the axial offset as a consequence of the core eccentricity relative to the fiber cladding. Only slight demands are made of the dimensional trueness of the component parts. Since the fiber positioning is oriented with respect to the mechanically rigid prescribed switch positions, multiple arrangement of coupling locations working parallel is possible in a minimum amount of space. Given a multiple arrangement of such coupling locations in, for example, a number of pairs of guide elements can also be simultaneously produced, aligned and fixed with the assistance of a plurality of auxiliary fibers.

The guide capillaries referenced 3a, 4a, 13a, 14a, 21a, 22a and 23a in the embodiments set forth above can also be advantageously fashioned to be continuously open at a side parallel to their axis. Such a laterally open capillary 27 and a guide element 28 that is fixed on a carrier element 1 is shown in FIG. 7. Such a guide element 28 having laterally open capillary 27 can either be produced on site on the carrier element 1 by means of a second casting process or upon employment of an auxiliary fiber or can be put in place on the carrier element 1 as a prefabricated part. The guide element 28 can be adjusted by means of an auxiliary fiber and then be fixed to the carrier element 1.

Care must be exercised in the manufacture of guide element 28 to ensure that the capillary 27 comprises a slot 29 parallel to the axis, so that, for example, the auxiliary fiber 2 can be removed from the capillary 27 at a right angle relative to the longitudinal axis of the capillary 27 after the second casting of the auxiliary fiber 2 upon reservation of an angular range of, for example, 120° as indicated in FIG. 8 by the arrow.

It is advantageous to utilize material for producing the guide element 28 and the capillary 27 which provides edges 30 which limit the slot 29 and have a certain elasticity, so that the edges 30 can elastically yield when the auxiliary fiber is removed.

Given the capillary 27 (see FIG. 9) already formed, as in the embodiments set forth above, it has its longitudinal axis exactly aligned to the longitudinal axis of a further capillary 27 and a further guide element 28 with the assistance of an auxiliary fiber 2 across a light waveguide coupling location. As shown in FIG. 10, function fiber 5 is also representative of function fiber 6, 24, 25 and 26, and is pressed into the capillary 27 through the slot 29, whereby, given suitable material selection of the guide element 28, the edges 30 elastically yield in an outward direction when the function fiber 5 is inserted. Finally, the function fiber 5 is seated in the capillary 27 of the guide element 28, as shown in FIG. 11. Fiber 5 is retained in the capillary 27 by the edges 30, which again assume their original position.

When pressing the function fiber 5 into the capillary 27, care should be exercised to see that an end face of the fiber 5 is situated outside of the guide element 28, so that no dislocation of the end face of the fiber 5 within the guide element 28 results. Axial parallel displacement of fiber 5 in the capillary 27 sets an optimal spacing between the end face of the fiber 5 and an end face of the fiber to be coupled to the fiber 5.

The lateral insertion of the function fiber 5 into a capillary 27 insures that the end face of the fiber 5 to which light transported by the fiber 5 enters or departs from cannot be contaminated by an axially parallel insertion of the fiber 5 into the capillary 27. Such contamination may occur by material being stripped from the inside wall of the capillary 27 during insertion of the fiber 5 into the respective guide element. The inside wall 31 of the capillary 29 can also be advantageously formed by a coating 32 of the auxiliary fiber 2. Given a proper suitable selection of material, uniting with the material of guide element 28 when the auxiliary fiber is second cast and the guide element 28 and the capillary 27 are formed and being stripped from the auxiliary fiber when the auxiliary fiber is removed from the capillary 27. Before the removal of auxiliary fiber 2 from the capillary 27, the coating 32 must thereby by opened along a generated line in the region of the gap 29.

The invention is not limited to the particular details of the method depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

We claim:

1. A method for suitably positioning light waveguides for coupling ends of function fibers at coupling locations, the coupling ends of the function fibers aligned and fixed on a carrier element, comprising:
   providing a guide element on the carrier element for each function fiber;
   providing a guide capillary in said guide element substantially fitted to a jacket of said function fiber;
   providing a wrap-free auxiliary fiber having a diameter substantially the same as a diameter of said function fiber;
   inserting said auxiliary fiber through said guide capillaries of at least two guide elements to align said guide elements on the carrier element and on either side of the coupling location;
   attaching said guide elements to the carrier element;
   removing said auxiliary fiber from said guide elements;
   inserting the function fibers into said guide capillaries of each of said guide elements such that their coupling ends are in axial alignment at the coupling location; and
   attaching the function fibers to said guide elements.

2. A method according to claim 1, wherein the step of proving a guide element and guide capillary comprises:
   applying a hardenable, solidifying material carrier element on both sides of the coupling location;
   forming said guide capillaries in said guide elements by casting said auxiliary fiber in said material such that said auxiliary fiber is cladded with said materials at both sides of the coupling location; and
   removing said auxiliary fiber after said material hardens.

3. A method according to claim 2, wherein said material adheres to said carrier element but does not substantially adhere to said auxiliary fiber, said material thereby forming said guide element.

4. A method according to claim 2, wherein said method further comprises:
   using as said material a viscous, hardenable plastic to form said guide elements.

5. A method according to claim 2, wherein said method further comprises:
   using a temporarily liquified solder to form said guide element.

6. A method according to claim 2, wherein said method further comprises:
   coating said auxiliary fiber with a film of parting agent before cladding with said material.

7. A method according to claim 1, wherein the steps of providing guide elements and guide capillaries comprises:
   using prefabricated guide sleeves in said guide elements having said guide capillaries, said auxiliary fiber being threaded through said guide capillaries of said guide sleeves for arrangement of said guide elements on both sides of the coupling location and for adherence thereto.

8. A method according to claim 7, wherein said method further comprises:
   forming said guide sleeves from a material stable in shape; and
   forming said guide capillaries by drilling said guide sleeves.

9. A method according to claim 7, wherein said method further comprises:

forming said guide sleeves by cladding said auxiliary fiber with a plastic, hardenable, solidifying material; and subsequently removing said auxiliary fiber from said material.

10. A method according to claim 1, wherein said method further comprises:

using a hardenable adhesive to attach said function fibers after said function fibers are inserted into their respective guide capillaries.

11. A method according to claim 1, wherein said method further comprises:

adjusting at least one of said function fibers by rotating said function fiber around its axis in the guide capillary before attaching said function fiber.

12. A method according to claim 1, wherein said method further comprises:

setting desired end facing spacing by aligning said function fibers in their longitudinal direction before attaching said function fibers.

13. A method according to claim 1, wherein said step of providing an auxiliary fiber comprises using a wire of a stiff and tensile material, particularly a SiC whisker wire, a steel wire or a boron fiber.

14. A method according to claim 1, wherein said method further comprises:

providing a funnel-shaped expansion for said guide capillaries in said guide elements on an end thereof facing away from the coupling location.

15. A method according to claim 2, said method further comprising:

cladding said auxiliary fiber with a substantially cone-shaped parting substance at a region of an end of said guide element facing away from the coupling location;

casting both said auxiliary fibers and said parting substance with said material for forming said guide element; and removing both said auxiliary fiber and said parting substance after said material hardens thereby forming said guide element having a guide capillary with a funnel-shaped expansion on an end of said guide element facing away from the coupling locations.

16. A method according to claim 1, said method further comprising:

providing a stationary carrier element and a mobile carrier element, each having a guide element;

after said auxiliary fiber has aligned said guide element on said stationary carrier element with said guide element on said mobile carrier element, removing said auxiliary fiber from only one of said guide elements;

moving said mobile carrier element to a second coupling location;

moving said auxiliary fiber across said second coupling location;

aligning and attaching an additional guide element by means of said auxiliary fiber.

17. A method according to claim 16, said method further comprising:

aligning and attaching said additional guide element on said guide element on said stationary carrier element.

18. A method according to claim 1, said method further comprising:

providing said guide capillaries with a continuous slot parallel to a longitudinal axis thereof; and inserting said function fibers laterally into said guide capillaries through said slot.

19. A method according to claim 18, said method further comprising:

providing edges on said slot which are elastically spreadable, said slot having a width smaller than the diameter of said function fibers.

20. A method according to claim 19, said method further comprising:

forming an inside wall for said capillary by stripping a fiber coating from said auxiliary fiber when said auxiliary fiber is removed from said guide element.

* * * * *